(12) United States Patent
Ludemann et al.

(10) Patent No.: US 10,849,385 B2
(45) Date of Patent: Dec. 1, 2020

(54) FOOTWEAR ASSEMBLY HAVING A VULCANIZED RUBBER LAYER AND POLYURETHANE LAYER

(71) Applicant: LaCrosse Footwear, Inc., Portland, OR (US)

(72) Inventors: John W. Ludemann, Canby, OR (US); Christopher Wayne Ledbetter, Vancouver, WA (US); Matt Beck, Portland, OR (US)

(73) Assignee: LaCrosse Footwear, Inc., Portland, OR (US)

( * ) Notice: Subject to any disclaimer, the term of this patent is extended or adjusted under 35 U.S.C. 154(b) by 119 days.

(21) Appl. No.: 15/940,619

(22) Filed: Mar. 29, 2018

(65) Prior Publication Data

US 2019/0297990 A1    Oct. 3, 2019

(51) Int. Cl.
| | | |
|---|---|---|
| *A43B 3/02* | (2006.01) | |
| *A43B 23/02* | (2006.01) | |
| *A43B 23/06* | (2006.01) | |
| *B29D 35/04* | (2010.01) | |
| *B29D 35/14* | (2010.01) | |
| *A43B 7/12* | (2006.01) | |
| *A43B 1/10* | (2006.01) | |
| *A43B 23/07* | (2006.01) | |
| *A43B 23/08* | (2006.01) | |
| *B29D 35/00* | (2010.01) | |

(52) U.S. Cl.
CPC .................. *A43B 7/12* (2013.01); *A43B 1/10* (2013.01); *A43B 3/02* (2013.01); *A43B 23/026* (2013.01); *A43B 23/0235* (2013.01); *A43B 23/06* (2013.01); *A43B 23/07* (2013.01); *A43B 23/081* (2013.01); *B29D 35/0009* (2013.01); *B29D 35/04* (2013.01); *B29D 35/146* (2013.01)

(58) Field of Classification Search
CPC .... A43B 3/02; A43B 3/04; A43B 5/08; A43B 7/32; A43B 23/0235; A43B 23/026; A43B 23/06; B29D 35/04; B29D 35/146
See application file for complete search history.

(56) References Cited

U.S. PATENT DOCUMENTS

| | | | | |
|---|---|---|---|---|
| 3,823,493 A | * | 7/1974 | Brehm ..................... | A43B 3/02 36/109 |
| 4,188,680 A | * | 2/1980 | Adams ..................... | A43B 3/02 12/142 E |
| D624,295 S | | 9/2010 | McCarron | |
| 8,361,369 B1 | * | 1/2013 | Cook ................. | B29D 35/0036 264/244 |

(Continued)

*Primary Examiner* — Sharon M Prange
(74) *Attorney, Agent, or Firm* — Perkins Coie LLP

(57) ABSTRACT

The present technology relates generally to a footwear assembly and method of manufacturing said footwear assembly. The footwear assembly includes an outsole and an upper connected to the outsole, where the upper includes a neoprene sock, a vulcanized rubber layer, and an injection molded layer. The neoprene sock is a full-foot neoprene sock having a foot portion that is configured to receive a wearer's foot. The vulcanized rubber layer fully covers a vamp portion, heel portion, toe portion, and ankle portion of the neoprene sock while only covering some of an underfoot portion. The injection molded layer is formed over a portion of the vulcanized rubber layer and completely covers the underfoot portion of the neoprene sock.

14 Claims, 5 Drawing Sheets

(56) References Cited

U.S. PATENT DOCUMENTS

| | | | |
|---|---|---|---|
| D701,374 S | 3/2014 | Feller et al. | |
| D712,638 S | 9/2014 | Barker et al. | |
| D722,761 S | 2/2015 | Monroy | |
| D723,259 S | 3/2015 | Norwood | |
| 8,984,776 B2* | 3/2015 | Ludemann | A43B 3/02 36/109 |
| 9,021,723 B2* | 5/2015 | Meyer | A43B 7/125 36/10 |
| D732,805 S | 6/2015 | Bruder | |
| D747,078 S | 1/2016 | Feller et al. | |
| D781,030 S | 3/2017 | Foust | |
| 9,635,902 B2* | 5/2017 | Spiller | A43B 7/32 |
| D812,865 S | 3/2018 | Dowd et al. | |
| 2004/0020077 A1* | 2/2004 | Thomas | A43B 7/12 36/4 |
| 2007/0039210 A1* | 2/2007 | Clark | A43B 1/0045 36/113 |
| 2015/0352762 A1* | 12/2015 | Giangrandi | B29C 45/14 264/244 |
| 2018/0103715 A1* | 4/2018 | Chen | A43B 3/02 |

* cited by examiner

FOOTWEAR ASSEMBLY HAVING A VULCANIZED RUBBER LAYER AND POLYURETHANE LAYER

TECHNICAL FIELD

Embodiments of the present invention are directed to waterproof footwear, such as footwear having a waterproof material injection molded onto an inner liner, and associated manufacturing methods.

BACKGROUND

Waterproof footwear, such as boots, are used in outdoor recreational activities as well as in a number of industrial and professional uses. One type of waterproof boots include an inner support layer fully covered by an outer layer of vulcanized rubber. The vulcanized rubber construction provides a strong, resilient, and durable boot, although such boots are typically fairly heavy and are difficult to provide a comfortable fit for a wearer's foot. In addition, boots fully covered in vulcanized rubber typically provide little thermal insulation to a wearer.

Other types of waterproof boots include a neoprene inner layer at least partially covered by a layer of injection molded polyurethane formed directly onto the neoprene. An example of a boot with polyurethane on a neoprene layer is disclosed in U.S. Pat. No. 8,984,776 titled Polyurethane Injected Boot Assembly and Associated Manufacturing Method, which is incorporated herein in its entirety by reference thereto. The neoprene and polyurethane layers are waterproof, lightweight, and provide additional insulation to the wearer's foot that ensures that the boots are comfortable for a wearer. In some extreme environments, the polyurethane/neoprene boots can be subjected to excessive wear and tear. Accordingly, there is a need for an improved waterproof boot that provides even more enhanced durability and protection.

DETAILED DESCRIPTION

Figure 1:
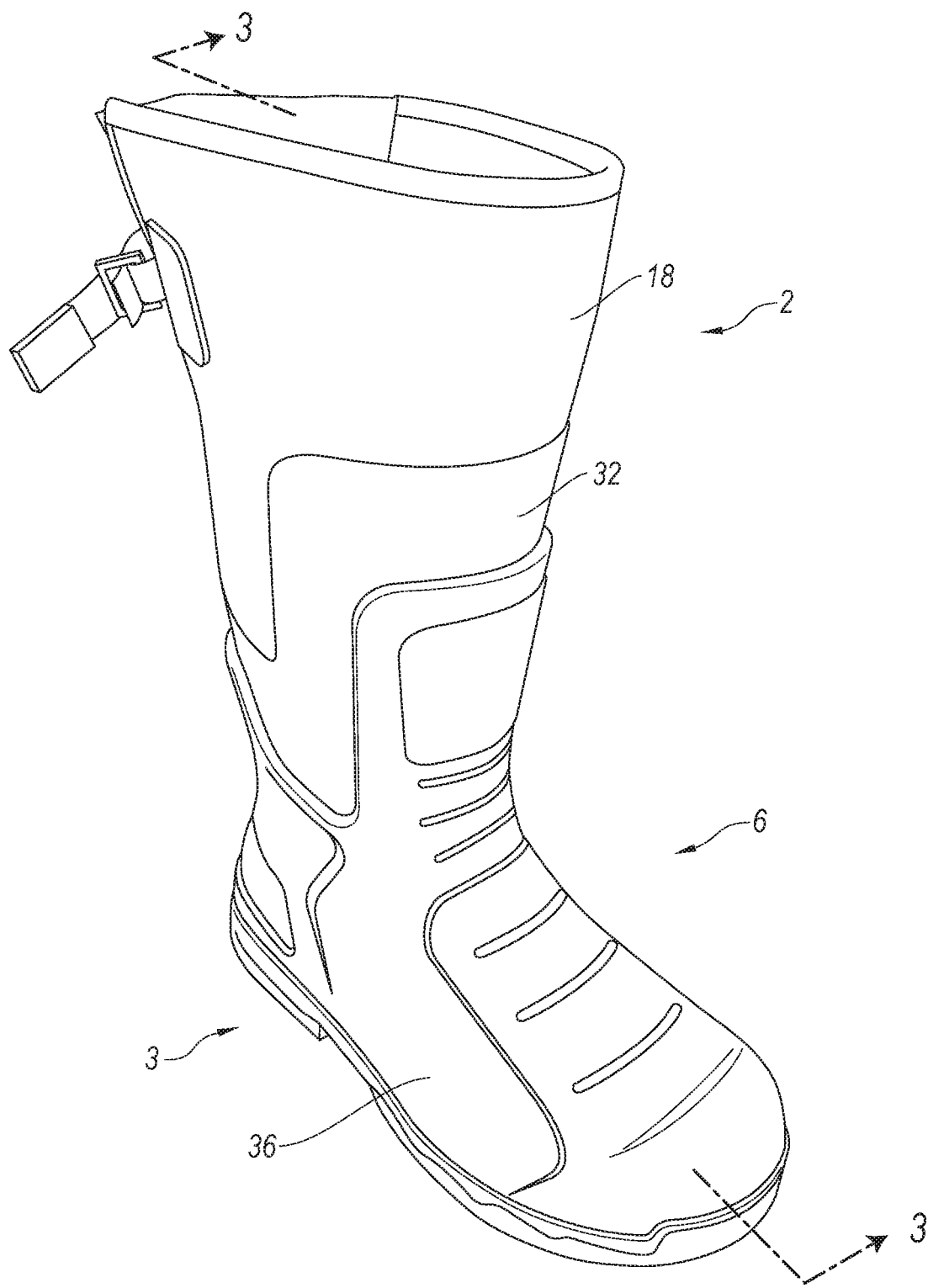
FIG. 1 is an isometric view of a waterproof footwear assembly in accordance with an embodiment of the present technology.

The present disclosure describes waterproof footwear assemblies (e.g., waterproof boots) and methods of manufacturing the footwear assemblies in accordance with certain embodiments of the present technology. Several specific details of the technology are set forth in the following description and the Figures to provide a thorough understanding of certain embodiments of the technology. One skilled in the art, however, will understand that the present technology may have additional embodiments, and that other embodiments of the technology may be practiced without several of the specific features described below.

Embodiments of the present technology provide waterproof footwear that overcomes drawbacks experienced in the prior art and that provide other benefits. At least one embodiment of the present technology provides a footwear assembly that has an outsole, and an upper connected to the outsole. The upper comprises a sock layer having a foot portion and a leg portion connected to the foot portion. The foot portion has an ankle portion, a vamp portion and an under-foot portion. A vulcanized rubber layer fully covers the vamp portion and the ankle portion of the sock layer. An injection molded layer fully covers the vamp portion, the ankle portion, and the under-foot portion, wherein the vulcanized rubber layer is between the sock layer and the injection molded layer.

Another embodiment provides a footwear assembly with an outsole and an upper connected to the outsole. The upper comprises a neoprene sock with a foot portion integrally connected to the leg portion. The neoprene sock has a heel portion, a vamp portion, and an under-foot portion. The leg portion has a shin side portion. The upper further comprises a vulcanized rubber layer that fully covers the foot portion and at least partially covers the shin side portion of the neoprene sock. An interface layer is on an exterior surface of the vulcanized rubber layer, wherein the vulcanized rubber layer is between the interface layer and the neoprene sock. An injection molded layer fully covers the foot portion and is molded directly onto at least some of the interface layer.

Another embodiment of the present technology provides a method of manufacturing a footwear assembly. The method comprises providing a sock layer having a foot portion configured to receive a wearer's foot, and arranging one or more segments of rubber onto the sock layer such that the one or more segments of rubber fully covers the foot portion. The one or more segments of rubber are vulcanized to form a vulcanized rubber layer on the exterior surface of the sock layer. The sock layer with the vulcanized rubber layer is placed into a mold. A flowable, injection moldable material is injected into the mold to form an injection molded layer that covers at least a portion of the vulcanized rubber layer and fully covers the foot portion of the sock layer. The sock layer with the vulcanized rubber layer and the injection molded layer permanently affixed thereon are removed from the mold.

Figure 2:
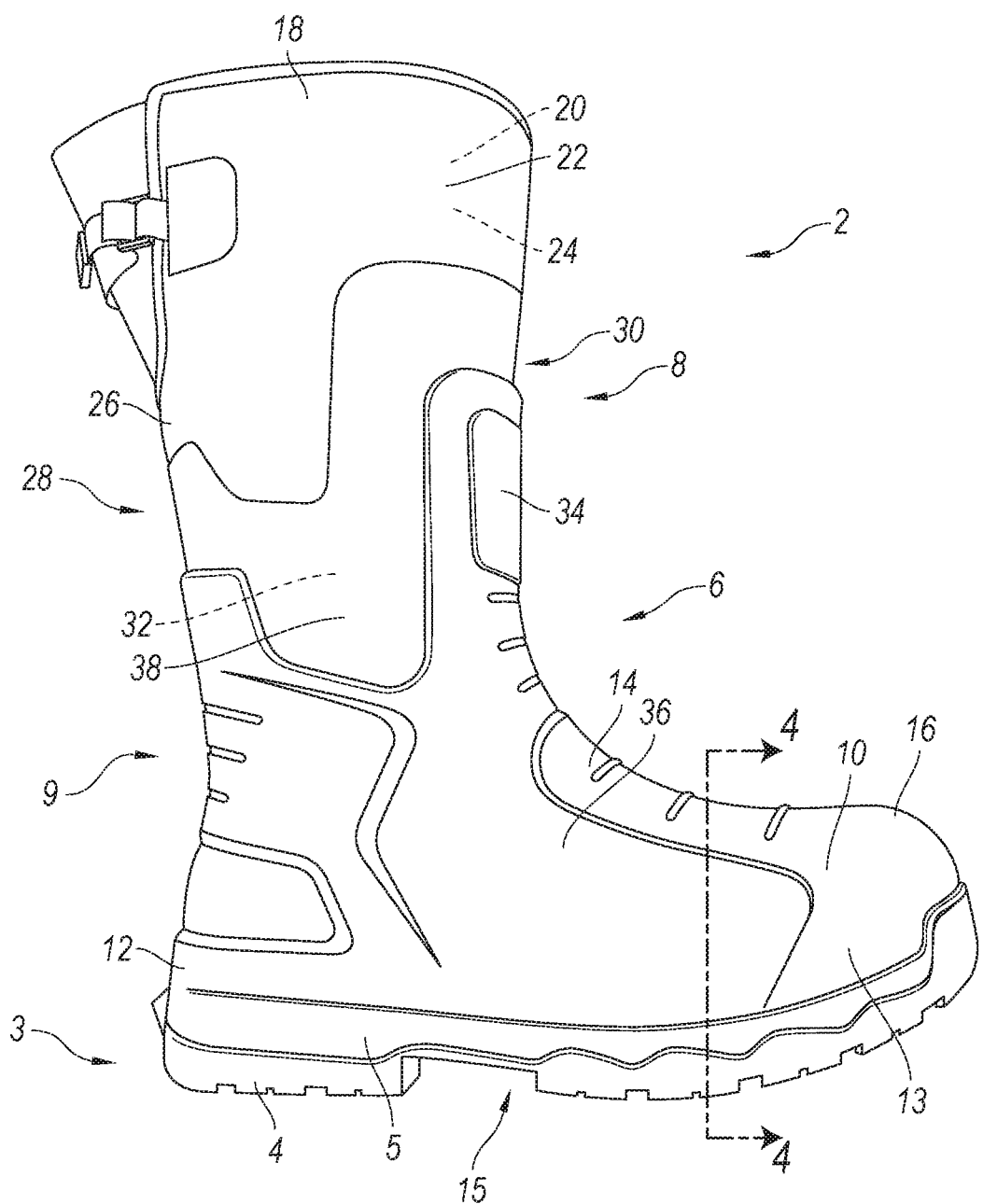
FIG. 2 is a side elevation view of the footwear assembly of FIG. 1.

Referring now to an embodiment of the present technology, with reference to the drawings, FIGS. 1 and 2 show a footwear assembly 2 in accordance with aspects of the illustrated embodiment. The footwear assembly 2 includes an upper 6 integrally coupled to a sole assembly 3. The upper 6 is an over-the-calf upper that includes a leg portion 8 integrally connected to a foot portion 10 at an ankle portion 9. The foot portion 10 includes a heel portion 12, a forefoot portion 13, a vamp portion 14, an under-foot portion 15, and a toe portion 16. The upper 6 is formed from a full-foot inner liner, such as a fabric or neoprene sock layer 18. A vulcanized rubber layer 32 covers a portion of the sock layer 18, and an external polyurethane (PU) layer 36 covers a portion of the vulcanized rubber layer 32. The sock layer 18 defines an interior area configured to receive a wearer's foot and lower leg such that the foot portion 10 surrounds the wearer's foot while the leg portion 8 surrounds the wearer's shin and calf.

The sock layer 18 of the illustrated embodiment is a neoprene sock, although in other embodiments the sock layer 18 can be a different material or combinations of materials, including EPDM or other synthetic rubber, mesh fabric, cotton, canvas, fleece, insulation, wool, other fabrics, a snake guard or other puncture resistant layer material, other inner layer materials, and/or a combination of materials. The neoprene sock layer of the illustrated embodiment has an inner layer 20, an outer layer 22, and a closed-cell, middle neoprene layer 24 sandwiched between the inner layer 20 and the outer layer 22. The neoprene sock layer 18 may have a thickness in the range of approximately 3.0 mm-8 mm, and more preferably in the range of approximately 3.5 mm-7 mm. In the illustrated embodiment, the neoprene layer 24 is formed from two pieces of neoprene material. One piece forms the floor region upon which a wearer's foot is supported, and the second piece of neoprene is shaped to cover the vamp, heel, ankle, and leg portions. The two pieces of neoprene can be connected to each other via stitching or other conventional techniques for joining pieces of neoprene together. The second piece of the neoprene is stitched to itself to close the heel, ankle, and leg portions of the neoprene sock 18. In this arrangement, the neoprene sock 18 has a stitched seam 26 that extends vertically along the back side of the upper (i.e., along the calf-side 28 of the leg portion 8) between the heel portion 12 and the top of the leg portion 8. Other embodiments can have a seam in other locations, such as along the top of the vamp portion 14 and along the front or shin-side 30 of the leg portion 8. The seam is sealed with a tape or other sealer material, so the neoprene sock 18 is fully waterproof.

The inner layer 20 of the neoprene sock 18 is formed from a fabric material, such as nylon, cotton, canvas, fleece, insulation, wool, mesh, or other desired material and is preferably selected to ensure the wearer's comfort. The outer layer 22 can also be a fabric material, such as a scrim layer, securely affixed to the outer surface of the neoprene layer 24, such that the outer layer 22 covers the entire neoprene layer 24. In other embodiments, the outer layer 22 may only cover selected portions of the neoprene layer 24. The outer layer 22 is preferably formed from a durable fabric material, such as Spandura®, nylon, cotton, canvas, fleece, wool, mesh, or some other selected material. The outer layer 22 can also be one or more selected colors, and/or it can include camouflage patterns, designs, images, indicia, or other visual features. While the illustrated embodiment uses a neoprene material, other embodiments can use other suitable materials, such as coated fabric, foam material, or other waterproof materials.

To increase the durability of the article of footwear 2 and provide protection to the wearer's foot, a vulcanized rubber layer 32 is formed on the exterior surface of the sock layer 18. During manufacturing, the sock layer 18 is placed on a last generally having the shape of a portion of a leg, ankle, and foot. The sock layer 18 on the last is positioned to receive segments or panels of un-vulcanized rubber material. In one embodiment, sheets of uncured natural rubber are formed and arranged on spools and a layer of mesh is applied onto the rubber sheets. The mesh, such as a nylon mesh, is adhered to the exterior surface of the rubber material. The sheets of rubber/mesh are cut into selected segments of desired sizes and shapes and positioned onto the outer surface of the lasted sock layer 18 (i.e., on the neoprene layer 24 or the outer layer 22), such that the rubber layer faces the sock layer 18 while the mesh faces away from the sock layer 18. Prior to arranging the rubber/mesh layer onto the sock layer 18, a bonding cement may be applied to either the rubber segments or to the sock layer 18, or both, to temporarily adhere the rubber to the external surface of the sock layer 18.

Figure 3:
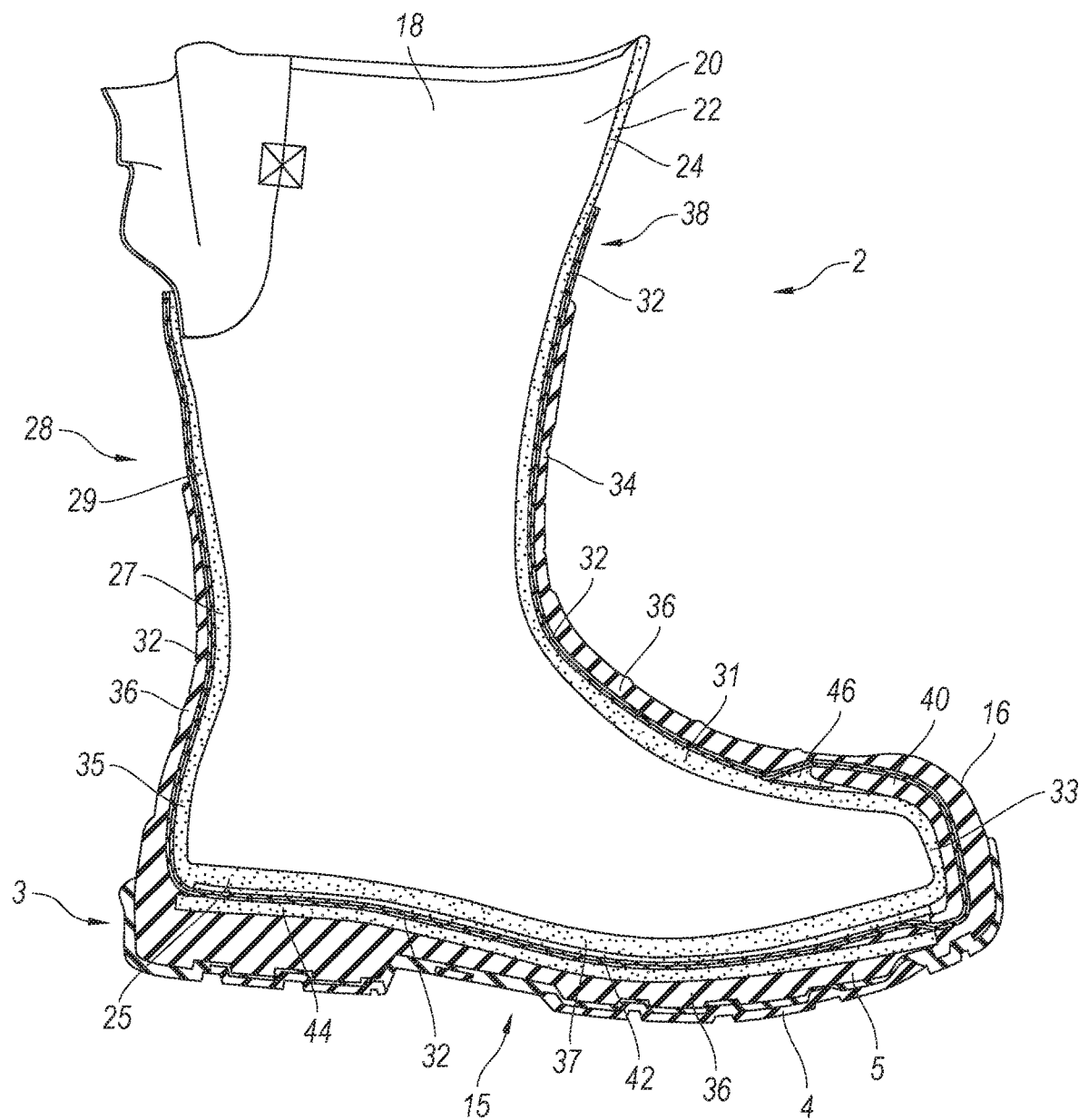
FIG. 3 is a cross-sectional view taken substantially along line 3-3 of FIG. 1.
Figure 4:
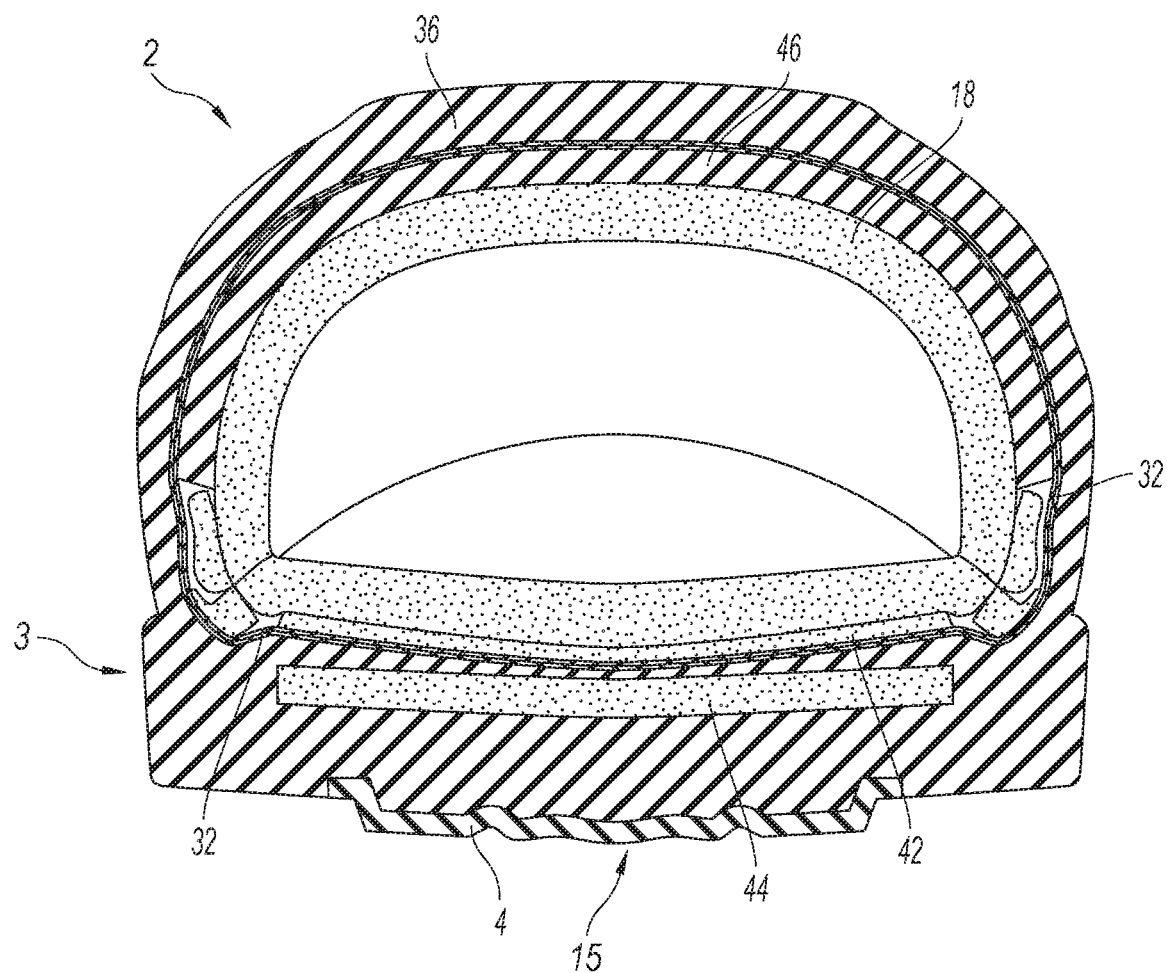
FIG. 4 is a cross-sectional view taken substantially along line 4-4 of FIG. 2.

The segments of rubber/mesh are cut and arranged such that the foot portion 25, the ankle portion 27, and at least some of the leg portion 29 of the sock layer 18 are covered, as shown in FIG. 3. More specifically, the generally-flexible rubber/mesh segments are arranged to fully cover the vamp portion 31, toe portion 33, and heel portion 35 of the sock layer 18. In the illustrated embodiment, the rubber/mesh material is also attached to the under-foot portion 37 of the sock layer 18. The segments of rubber/mesh material are sized and shaped such that, when properly positioned onto the sock layer 18, the segments at least partially overlap, thereby helping to prevent the formation of gaps between the segments.

In some embodiments, the footwear assembly 2 includes additional safety and comfort-related components positioned around a neoprene sock layer 18. For example, the embodiment shown in FIG. 3, an insole board 42 and a toe guard insert 40 are located between the vulcanized rubber layer 32 and the neoprene sock layer 18. The insole board 42 can be formed from a generally stiff material configured to provide stability to the wearer's foot by limiting any undesired rotation or flexion of the foot. The insole board 42 can be a puncture-proof board that protects the wearer's foot from nails, screws, wires, etc., from fully puncturing through the sole assembly to the interior area of the footwear. The toe guard insert 40 can be a non-metallic toe guard configured to prevent an object from striking and collapsing the toe portion 16 of the upper's foot portion 10, thereby protecting the wearer's toes from impact. Prior to the application of the rubber/mesh material, the toe guard insert 40 is positioned around the toe portion 33 of the neoprene sock 18, and the insole board 42 is positioned against the under-foot portion 37 of the neoprene sock 18. The rubber/mesh segments are applied to the outer surface of the neoprene sock 18, such that both the toe guard insert 40 and the insole board 42 are completely covered by the rubber/mesh material. The footwear assembly 2 may also include a rubber spacer 46 positioned adjacent to the toe guard insert 40 so as to prevent the formation of a void or open space between the neoprene sock 18 and the vulcanized rubber layer 32 next to the to guard insert 40. The footwear assembly 2 can also include an additional snake guard or other puncture resistant layer attached or otherwise coupled to the sock layer at selected portions of the upper. The snake guard or other puncture resistant layer may be partially or fully covered by the vulcanized rubber layer 32, or the snake guard or other puncture resistant layer may be outward of the vulcanized rubber layer and fully or partially covered by the PU layer 36.

After arranging the uncured rubber/mesh segments onto the lasted neoprene sock 18, the intermediate neoprene and rubber layered assembly is placed in an autoclave (or oven) to cure and vulcanize the natural rubber so as to form the vulcanized rubber layer 32 over the selected portions of the neoprene sock 18. In the autoclave, the intermediate assembly is subjected to heat and pressure that causes the rubber material to bond directly to the outer surface of the neoprene sock 18 and causes the rubber to undergo a vulcanization process where cross-linking between individual polymer chains occurs. The vulcanization process also permanently and integrally affixes the nylon mesh layer to the outer surface of the rubber material. The rubber vulcanization process is further disclosed in U.S. patent application Ser. No. 10/356,361, filed Jan. 31, 2003, and titled "Rubber Footwear with Neoprene Layer", which is incorporated herein in its entirety by reference. Once the curing process has completed and the vulcanized rubber layer 32 has formed, the vulcanized rubber layer provides increased durability, tensile strength, resiliency, and durability for the footwear assembly 2. In the illustrated embodiment, the vulcanized rubber layer 32 fully covers the foot portion 25 and ankle portion 27, while only partially covering the leg portion 29. For example, FIGS. 2 and 3 show that the vulcanized rubber layer 32 covers some of the shin side 30 of the leg portion 8 of the neoprene sock 18. Other portions of the neoprene sock 18, such as the calf side 28 and the side walls of the leg portion 16, remain uncovered by the vulcanized rubber layer 32 and the PU layer 36.

After the vulcanized rubber layer 32 has cured, the exterior nylon mesh attached to the rubber acts an interface layer 38 that aids in bonding the PU layer 36 to the vulcanized rubber layer 32, as discussed in greater detail below. The portions of the nylon mesh not covered by the PU layer 36 also provide an outwardly facing surface. The outwardly facing mesh may be a patterned mesh having visually appealing patterns, shapes, or designs formed from the nylon material. The outwardly facing mesh material can also allow patterns, shapes, or designs formed on the outwardly facing surface of the neoprene portion of the sock to be substantially visible to a user.

After the vulcanized rubber layer 32 has fully cured, the intermediate assembly of the neoprene sock 18 with the exterior vulcanized rubber layer 32 is removed from the last. The intermediate assembly is prepared for an injection molding process, wherein the PU material is injection molded onto the exterior surface of the intermediate assembly to form the outer, injection molded PU layer 36 of the footwear assembly 2. Once formed, the PU layer 36 covers the vulcanized rubber layer 32 around the foot portion 10, such that the under-foot portion 37, toe portion 33, vamp portion 31, and the heel portion 35 of the sock layer 18 are fully covered by PU layer 36. The under-foot portion of the PU layer 36 between the neoprene sock 18 and the outsole 4 is sufficiently thick to define a cushioning and/or shock attenuation layer under the wearer's foot so as to effectively act as an integrated midsole portion to which the outsole 4 is attached. The under-foot portion of the PU layer 36 can have a varying thickness to achieve selected performance or comfort objectives. In one embodiment, the integrated PU layer 36 can be thicker in the heel area to absorb or otherwise reduce impact loads at heel strike of the wearer's gait cycle. The under-foot portion of the PU layer 36 can be configured in the arch area to essentially encapsulate a shank positioned under the neoprene sock 18 in the arch area. In another embodiment, the shank can be positioned between the outsole 4 and PU layer 36. In yet another embodiment, the shank may be fully encapsulated within the PU material in the under-foot portion.

In the illustrated embodiment, the PU layer 36 is also formed on the ankle portion 27 of the sock layer 18 and even covers some of the leg portion 29. More specifically, a portion of the PU layer 36 is formed on the exterior portion of the vulcanized rubber layer 32 (i.e., over the external mesh layer) formed on the shin side of the neoprene sock layer 18. In this arrangement, the PU layer 36 and the vulcanized rubber layer 32 form a shin guard 34 configured to provide protection to the wearer's shin. In the illustrated embodiment, the portions of the PU layer 36 and the vulcanized rubber layer 32 that form the shin guard 34 are integrally connected to the rest of the PU layer 36 and vulcanized rubber layer 32. In other embodiments, however, the shin guard 34 is formed from portions of the PU layer 36 and the vulcanized rubber layer 32 that are separated from portions that cover the ankle portion 27 and foot portion 25. In either embodiment, the portions of the PU layer 36 and the vulcanized rubber layer 32 that form the shin guard 34 are formed simultaneously with the rest of the PU layer 36 and the vulcanized rubber layer 32. In other embodiments, the PU layer 36 may terminate below the shin portion, so the PU layer 36 does not form a shin guard 34.

To form the PU layer 32, the intermediate assembly formed by the neoprene sock 18 and vulcanized rubber layer 32 are placed onto a second last coupled to an injection molding machine and positioned within a selected mold configured to receive flowable PU material. Other components of the footwear assembly 2, such as a puncture resistant layer 44 and the outsole 4 are also arranged within the mold adjacent to the under-foot portion of the neoprene sock 18. The puncture resistant layer 44 can be formed from a metallic, partially metallic, or nonmetallic material that provides sufficient puncture resistance in accordance with the ANSI or ASTM standards or other similar performance standard for footwear. At least one embodiment includes a puncture resistant material manufactured by LENZI®.

The mold includes dam portions configured to sealably engage with the exterior surface of the vulcanized rubber material so as to limit or prevent the flowable PU material from bleeding onto the portions of the vulcanized rubber layer 32 and the neoprene sock 18 that are to remain exposed and PU-free. The dam portions are carefully sized and controlled so as to press against the vulcanized rubber layer 32 firmly enough to prevent leakage of the PU material but not enough to crush and damage the vulcanized rubber or neoprene material. The dam portions may be carefully shaped and sized based on the characteristics of the PU material (e.g., the viscosity) and the characteristics of the vulcanized rubber material (e.g., its crush resistance) to ensure proper control of the flowing PU material without damaging the vulcanized rubber layer 32 or the neoprene sock 18.

After arranging the intermediate assembly and any associated additional components within the mold (e.g., the outsole, a puncture resistant layer, a shank, etc.), the mold is closed and the flowable PU material is injected into the mold such that the PU material flows around the exterior surface of the vulcanized rubber layer 32 and between the underfoot portion and the outsole 4. After the injection is completed and the injected PU material cools and/or cures, the mold is opened for removal of the formed footwear assembly 2 from the last.

During the PU injection process, the nylon mesh forming the exterior surface of the vulcanized rubber layer 32 acts as an interface layer 38 to which the PU material readily and permanently binds and adheres. As a result, the interface layer 38 helps to prevent the PU layer 36 from separating or peeling away from the vulcanized rubber layer 32 and similarly helps to prevent the formation of air bubbles between the PU material and the vulcanized rubber layer 32. Further, the interface layer 38 is configured to help the dam portions of the mold sealably engage with the footwear assembly 2 during the formation of the PU layer 36 so as to help reduce any undesired bleeding of the PU material onto the vulcanized rubber layer 32.

The combination of the vulcanized rubber and the neoprene at the vamp portion 14 can be configured with a selected thickness to form an integrated metatarsal guard construction that provides sufficient shock absorption and impact abatement to meet or exceed the ANSI and/or ASTM metatarsal guard requirements for footwear. Accordingly, the resulting footwear assembly 2 can be a certified metatarsal guard footwear assembly. In one embodiment, such metatarsal guard protection can be provided using a neoprene sock 18 with a thickness in the range of approximately 3 mm-5 mm. In at least one embodiment, the PU layer 36 at the vamp area has a thickness of approximately 3.5 mm, and the vulcanized rubber has a thickness of approximately 2 mm at least at the vamp portion. Other embodiments can use other thicknesses of the neoprene sock and/or the vulcanized rubber layer to provide the selected metatarsal guard construction. In another embodiment, a metatarsal guard insert can be provided over the vamp portion 14 of the neoprene sock before or after vulcanizing the rubber layer onto the neoprene sock 18. When the segments of rubber and mesh material are arranged over the metatarsal guard and the neoprene sock 18 and then vulcanized, the metatarsal guard insert is fully covered and/or encapsulated within the vulcanized rubber. With this construction, the metatarsal guard insert may or may not be visible from the exterior of the footwear assembly 2.

The embodiment(s) described herein and shown in the figures include the layer of PU material injection molded onto the selected portions of the vulcanized rubber and the neoprene sock. Other embodiments can utilize other suitable flowable, injection moldable materials, such as thermoplastic polyurethane (TPU), Styrene Ethylbutylene Styrene (SEBS), or other suitable flowable injection-moldable material that can be injection molded directly onto selected portions of the neoprene layer 24 in a single molding process.

In the illustrated embodiment, the interface layer 38 formed by the nylon mesh material is formed directly onto the vulcanized rubber layer 32 so as to help the PU layer 36 bind to the vulcanized rubber layer 32. In other embodiments, however, the footwear assembly 2 does not include the interface layer 38. Instead, the uncured natural rubber is applied to the neoprene sock 18 without the mesh material and the vulcanized rubber layer 32 is exposed. In these embodiments, portions of the outer surface of the vulcanized rubber layer 32 may be roughed-up (e.g., using an abrasive material, such as sandpaper, steel wool, or the like) such that some of the vulcanized rubber layer 32 has an uneven and rough outer surface. The roughed-up surface can then form an improved bonding surface to which the PU material permanently adheres. To ensure that the appearance of the footwear assembly 2 is not compromised by the roughened rubber surface, only the portions of the vulcanized rubber layer 32 that are to be covered by the PU layer 36 are scratched or otherwise sufficiently textured while the other exposed portions of the vulcanized rubber layer remain substantially smooth.

In the embodiments shown in FIGS. 1-4, the footwear assembly 2 includes an upper 6 having a leg portion 8 that extends over a wearer's calf and terminates at or near the wearer's knee. In other embodiments, however, the footwear assembly 2 may not include an upper 6 that includes such a leg portion 8. Instead, the upper 6 may include a foot portion 10 and an ankle portion 9 integrally connected to the foot portion 10. Further, the footwear assembly 2 includes a full-foot neoprene sock 18 that terminates at or above the ankle portion 9 without extending over the wearer's calf. In other embodiments, the footwear assembly 2 may have a leg portion 8 that extends partially up the wearer's calf but does not extend completely over their calf. In general, the sock layer, the vulcanized rubber layer, and the PU layer arrangement described in connection with FIGS. 1-4 may be implemented into footwear assemblies having uppers that extend to any desired point on the wearer's leg.

Figure 5:
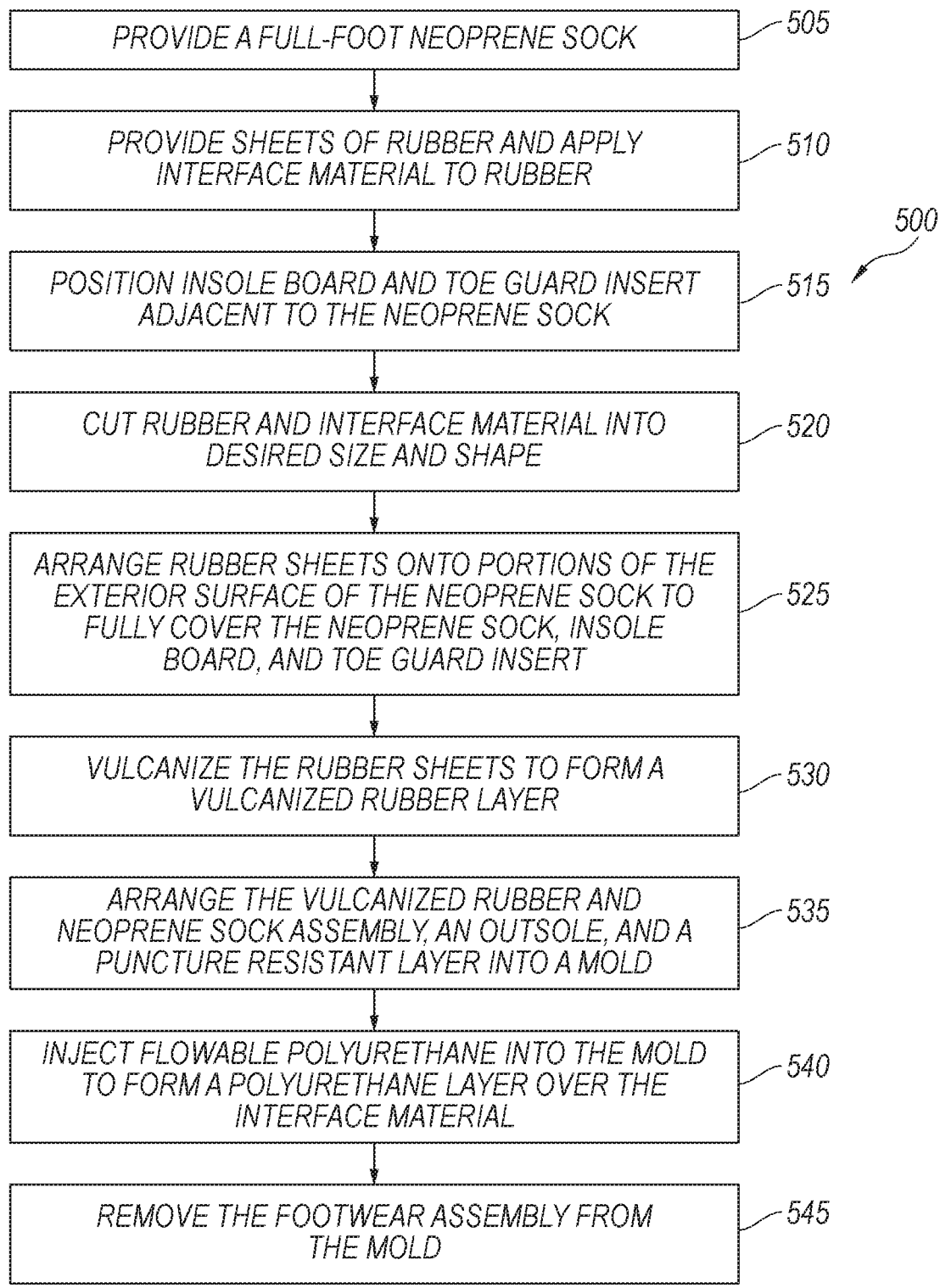
FIG. 5 is a method of manufacturing the footwear assembly of FIG. 1.

FIG. 5 shows a method 500 of manufacturing the footwear assembly depicted in FIG. 1. At step 505, a sock layer is provided. The sock layer may be a full-foot neoprene sock sized and shaped to receive a wearer's foot. The sock layer may also be configured to extend upwardly over the wearer's ankle and to cover the wearer's shin and calf.

At step 510, sheets of natural and uncured (or partially-cured) rubber are provided and an interface material is applied. At step 515, an insole board and toe guard insert may be attached to or positioned adjacent to the sock layer. The insole board is positioned next to an under-foot portion of the sock layer, while the toe guard insert is positioned around the toe portion of the sock layer.

At step 520, the sheets of rubber and interface material are cut or stamped into segments having desired sizes and shapes that best conform to the shape of the sock layer. At step 525, the rubber segments are applied to the exterior surface of the sock layer such that an ankle portion and a foot portion of the sock layer are substantially fully covered, while some of a leg portion remains uncovered. Furthermore, the rubber and interface material fully cover the insole board and the toe guard insert (when used), such that the insole board and toe guard are positioned between the sock layer and the segments of the rubber.

At step 530, the rubber segments are vulcanized to form a vulcanized rubber layer permanently affixed to the sock layer. The intermediate assembly of the sock layer and the vulcanized rubber layer can be removed from the first last when the vulcanized rubber has sufficiently cooled and/or cured.

At step 535, the intermediate assembly is placed on a second last, which is positioned in a PU injection mold, along with an outsole and a puncture resistant layer. At step 540, flowable polyurethane is injected into the mold to form the outer PU layer. The mold is configured so the PU is injected to cover the external rubber layer of the intermediate assembly's foot portion, ankle portion, and some of the leg portion. The PU also flows between the outsole and the puncture resistant layer to form a midsole for the footwear assembly. At step 545, the completed footwear assembly is removed from the mold and from the second last after the polyurethane material has sufficiently cooled and/or cured. The footwear assembly can then be cleaned up as needed, packaged, and shipped for ultimate delivery to an end user.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A footwear assembly, comprising:
   an outsole; and
   an upper connected to the outsole, the upper comprising:
   a sock layer having a foot portion and a leg portion connected to the foot portion, wherein the foot portion comprises an ankle portion, a vamp portion and an under-foot portion;
   a vulcanized rubber layer bonded to and fully covering an outer surface of the vamp portion and the ankle portion of the sock layer;
   an injection molded layer that fully covers the vamp portion, the ankle portion, and the under-foot portion, wherein the vulcanized rubber layer is interposed between the sock layer and the injection molded layer; and
   an interface layer on the vulcanized rubber layer and between the vulcanized rubber layer and the injection molded layer.

2. The footwear assembly of claim 1, wherein— the leg portion comprises a shin side portion, the vulcanized rubber layer and the injection molded layer both include portions that cover at least some of the shin side portion of the leg portion of the sock layer forming a shin guard on the shin-side portion of the sock layer.

3. The footwear assembly of claim 1 wherein the interface layer comprises a mesh material bonded to the vulcanized rubber layer.

4. The footwear assembly of claim 1 wherein the sock layer is a neoprene sock layer.

5. The footwear assembly of claim 1, wherein the foot portion further comprises a toe portion and a heel portion, and wherein the vulcanized rubber layer fully covers the toe portion and the heel portion.

6. The footwear assembly of claim 5, wherein the vulcanized rubber layer fully covers the underfoot portion of the sock layer.

7. The footwear assembly of claim 5, further comprising at least one of a toe guard insert positioned around the toe portion of the sock layer, and a puncture resistant layer between the outsole and the under-foot portion of the sock layer.

8. The footwear assembly of claim 1 wherein the injection molded layer comprises polyurethane.

9. The footwear assembly of claim 1 wherein the vulcanized rubber layer terminates below a top of the leg portion and above a top of the injection molded layer.

10. A footwear assembly, comprising:
an outsole; and
an upper connected to the outsole, the upper comprising a neoprene sock having foot and leg portions, the foot portion being integrally connected to the leg portion and having a heel portion, a vamp portion, and an under-foot portion, the leg portion having a shin side portion, wherein the upper further comprises:
 a vulcanized rubber layer bonded to and fully covering the foot portion and bonded to and at least partially covering the shin side portion of the neoprene sock;
 an interface layer on an exterior surface of the vulcanized rubber layer, wherein the vulcanized rubber layer is between the interface layer and the neoprene sock; and
 an injection molded layer that fully covers the foot portion and is molded directly onto at least some of the interface layer.

11. The footwear assembly of claim 10, the upper further comprising an insole board positioned adjacent to the under-foot portion of the neoprene sock, wherein the insole board is between the neoprene sock and the vulcanized rubber layer.

12. The footwear assembly of claim 10, wherein the vulcanized rubber layer and the injection molded layer each include portions that partially cover the shin side portion of the leg portion of the neoprene sock defining a shin guard.

13. The footwear assembly of claim 10 wherein the injection molded layer defines an integrated midsole portion between the neoprene sock and the outsole.

14. The footwear assembly of claim 10 wherein the injection molded layer comprises polyurethane.

* * * * *